PROCESS FOR THE MANUFACTURE OF MAGNESIUM ALUMINOSILICATE FOR MEDICAL USES

Seizo Ishino, Toyama-shi, and Matajiro Osaka, Imizu-gun, Japan, assignors to Fuji Kagaku Kogyo Kabushiki Kaisha, Naka-Niikawa-gun, Japan, a company of Japan No Drawing. Filed Mar. 14, 1957, Ser. No. 645,908

Claims priority, application Japan Sept. 26, 1956

2 Claims. (Cl. 23—110)

The present invention relates to magnesium aluminosilicate and a process for the manufacture thereof.

The primary object of this invention is to provide a novel magnesium aluminosilicate, which has excellent properties as an antacid when used for medical purposes, producing no accompanying unfavourable action. Another object of the invention is to produce the novel antacid easily at a low cost.

The special features and advantages of the present invention will be understood from the following description.

The magnesium aluminosilicate, according to this invention, has a composition of $MgO \cdot Al_2O_3 \cdot 2SiO_2 \cdot 2H_2O$ and is a light, fine, and almost tasteless and odourless white powder that can be obtained in the following way: An aqueous sodium aluminate solution (the composition thereof: $Al_2O_3/Na_2O \to 1:1$ to $1:3$) containing alumina of a concentration within the range of from 1.7 percent to 6.9 percent, is mixed with an aqueous sodium silicate solution ($Na_2SiO_3$) containing silica of a concentration within the range of from 2.0 percent to 8.0 percent, in a mol ratio of $Al_2O_3:SiO_2$ of at least 1:2, to obtain sodium aluminosilicate having a mol ratio of $Al_2O_3:SiO_2$ of 1:2, which is mixed with a magnesium salt which is converted into magnesium hydroxide by caustic soda which is present in the solution. The magnesium hydroxide thus obtained, or magnesium hydroxide prepared in any other way, then reacts with sodium aluminosilicate to effect a substitution reaction, whereby the sodium aluminosilicate is converted into magnesium aluminosilicate. Then, this magnesium aluminosilicate is repeatedly washed with water, in which aluminum sulfate or mineral acid has been dissolved, to remove free caustic soda. Then after the substitution reaction has been completed, the magnesium aluminosilicate thus treated is further washed with water, filtered and dried to produce the magnesium aluminosilicate of this invention.

The aluminum silicate usually used as an antacid agent is produced by a well-known process, wherein sodium silicate solution is caused to react with sodium aluminate solution. 94 percent of aluminum silicate can be precipitated when the mol ratio of alumina to silica is 1:3, while only approximately 70 percent of aluminum silicate can be precipitated when the mol ratio of alumina to silica decreases from 1:2 to 1:4 or 1:5 and thus it is seen that the precipitation of aluminum silicate then produced is less than the case where the mol ratio of alumina to silica is 1:3. Nothing has been disclosed as yet with respect to the product of the reaction wherein the ratio of alumina to silica is more than 1:2.

The production of magnesium aluminosilicate according to this invention is carried out by a process, wherein an aqueous sodium aluminate solution containing alumina of a concentration within the range of from 1.7 percent to 6.9 percent is mixed with an aqueous sodium silicate solution containing silica of a concentration within the range of from 2.0 percent to 8.0 percent in a mol ratio of alumina to silica more than 1:2. The thus obtained mixture is caused to react to produce sodium aluminosilicate, and this sodium aluminosilicate and magnesium hydroxide are caused to undergo a substitution reaction to obtain magnesium aluminosilicate. When mixed to an approximately 1:1.6 mol ratio of alumina to silica and caused to react with each other, the production of sodium aluminosilicate will bring about a good result.

The said product is a compound quite different from the well-known aluminum silicate in composition as well as in function. There is also a difference in the manufacturing process.

The chemical reaction in this instance is shown by the following equations:

$Al_2(SO_4)_3 + 8NaOH = Na_2O \cdot Al_2O_3 + 3Na_2SO_4 + 4H_2O$
$Al_2(SO_4)_3 + 10NaOH = 2Na_2O \cdot Al_2O_3 + 3Na_2SO_4 + 5H_2O$
$Al_2(SO_4)_3 + 12NaOH = 3Na_2O \cdot Al_2O_3 + 3Na_2SO_4 + 6H_2O$
$Na_2O \cdot Al_2O_3 + 2Na_2SiO_3 + 2H_2O$
$\qquad = Na_2O \cdot Al_2O_3 \cdot 2SiO_2 + 4NaOH$
$2Na_2O \cdot Al_2O_3 + 2Na_2SiO_3 + 3H_2O$
$\qquad = Na_2O \cdot Al_2O_3 \cdot 2SiO_2 + 6NaOH$
$3Na_2O \cdot Al_2O_3 + 2Na_2SiO_3 + 4H_2O$
$\qquad = Na_2O \cdot Al_2O_3 \cdot 2SiO_2 + 8NaOH$
$Na_2O \cdot Al_2O_3 \cdot 2SiO_2 + Mg(OH)_2$
$\qquad = MgO \cdot Al_2O_3 \cdot 2SiO_2 + 2NaOH$ In this case, when sodium aluminate having a composition $Na_2O \cdot Al_2O_3$ is used, the best yield is obtained. It is therefore advisable to use sodium aluminate of such a composition.

When sodium aluminosilicate according to the present invention as obtained by a reaction effected with a mol ratio more than 1:2 of alumina to silica is compared with aluminum silicate as obtained by the well-known method in a reaction effected with a mol ratio less than 1:2 of alumina to silica as their antacid properties which have been determined by the antacidity test described under the chapter relating to dry aluminum hydroxide gel in the Japanese Pharmacopoeia, Ed. VI, the consumption of N/10 hydrochloric acid per gram is 220 cc. for the former and approximately 65 cc. for the latter. It indicates therefore what their antacid property evidently differs from one another.

The magnesium aluminosilicate of this invention shows, for instance, an analytical value as follows:

|  | Percent |  | Percent |
|---|---|---|---|
| $Al_2O_3$ | 33.00 | MgO | 12.71 |
| $SiO_2$ | 39.00 | Ignition loss | 12.92 | and its composition is regarded to be $$MgO \cdot Al_2O_3 \cdot 2SiO_2 \cdot 2H_2O$$

from the result of the analysis.

The magnesium aluminosilicate of this invention is tasteless and odourless fine white amorphous powder, which is insoluble in water and warm water. When the said powder is administered, it will be effective as a stomach acid neutralizing agent. It becomes gelatin-like in form and then forms a coating on the wall of the stomach protecting the mucous membrane. Magnesium chloride formed by the decomposition acts as a laxative to alleviate constipation and improve the action of the bowels, etc. Thus, because of these properties, it can be used with excellent results, as an antacid as well as a medicine for troubles of stomach and bowels, for the treatment of acid dyspepsia, stomach catarrh, gastric ulcer, crapulence, belching, duodenal ulcer, etc. The dosage is 0.5 to 1 gram, 3 to 4 times daily with water or warm water.

The magnesium aluminosilicate of this invention, synthetic aluminum silicate and dry aluminum hydroxide as described in the Japanese Pharmacopoeia, Ed. VI, have been compared with one another through the testing methods for the determination of antacidity and its degree, as prescribed in the Japanese Pharmacopoeia, Ed. VI, and the result of this comparison is shown as follows:

| Antacidity Test<br>Kind of Medicine | Antacidity as prescribed in the Chapter of Synthetic Aluminium Silicate of Jap. Pharmacopoeia, Ed. VI | Antacidity as prescribed in the Chapter of Dry Aluminium Hydroxide Gel of Jap. Pharmacopoeia, Ed. VI. |
| --- | --- | --- |
| Commercial Synethetic Aluminum Silicate according to Jap. Pharmacopoeia, Ed. VI. | Percent<br>5.2–5.5 | Cc.<br>Approx. 65. |
| Commercial Dry Aluminum Hydroxide Gel according to Jap. Pharmacopoeia, Ed. VI. | | 250–270. |
| Magnesium Aluminosilicate obtainable by the present Invention. | 13–17 | 220–280. |

The magnesium aluminosilicate according to this invention is an entirely new medicine for the stomach and bowels and an antacid medicine which has not been used before, and it is a novel medicine showing excellent effects as compared with any of the usual similar medicines.

*Example 1*

Two hundred and forty kilograms of industrial aluminium sulfate containing 17.2 percent of alumina is dissolved in 700 kilograms of water; 50 kilograms of anhydrous sodium carbonate is dissolved in hot water and added thereto and allowed to stand for 2 to 3 days; the thus formed grey brownish impurities and sand particles, etc. are removed; 138 kilograms of the thus purified aluminum sulfate is then dissolved in 850 kilograms of water; then, 90 kilograms of solid caustic soda is added to the solution in small increments and stirred thoroughly, to cause the precipitation of aluminium hydroxide, which is converted to sodium aluminate and redissolves gradually, leaving a strong alkaline solution; 80 kilograms of sodium silicate containing 37 percent $SiO_2$ is dissolved in 500 kilograms of water and added to the sodium aluminate solution, and stirred thoroughly, to precipitate sodium aluminosilicate. 84 kilograms of crystallized magnesium chloride containing 44.5 percent magnesium chloride is dissolved in 300 kilograms of water and added to the thus formed suspension. The magnesium chloride is converted to magnesium hydroxide due to the presence of caustic soda in the solution, and magnesium aluminosilicate is formed through a substitution reaction with sodium aluminosilicate. Then, excess caustic soda and a major portion of the caustic soda produced by the substitution reaction are removed by repeated washing in water by decantation until no caustic soda remains in the filtrate, or the content of soluble salt in the filtrate solution becomes only a trace. The further caustic soda which forms gradually is neutralized by adding little by little a solution of aluminium sulfate dissolved in a suitable amount of water. The solution is filtered under pressure and the residue is dried at a temperature below 100° C. to powdered form. Then, it is further dried at 250° C. and pulverized and 120 kilograms of finished magnesium aluminosilicate is obtained.

The thus obtained magnesium aluminosilicate is a light, fine white powder and substantially tasteless and odourless and is not soluble in water or alcohol. When it is heated with hydrochloric acid, it will be decomposed gradually and dissolved. The product contains neither heavy metal nor arsenic, has a high antacidity, and 4 grams of the product may be administered admixed in warm water in equal doses, 30 minutes after each meal and 30 minutes before going to bed, for the remedy of acid dyspepsia, stomach catarrh, gastric ulcer, etc.

The alleviation of the patient's symptoms can be obtained by the above administration without accompanying side effects, such as stomach ache, vomiting, uneasy stomach feeling, constipation, diarrhoea, etc.

*Example 2*

Ninety six kilograms of purified aluminium sulfate is dissolved in 850 kilograms of water, and 112 kilograms of solid caustic soda is added to the thus obtained solution little by little to produce sodium aluminate ($2Na_2O.Al_2O_3$). Then, 80 kilograms of sodium silicate containing 37 percent $SiO_2$ is dissolved in 500 kilograms of water and added to the thus produced sodium aluminate and stirred well to cause the precipitation of sodium aluminosilicate. 17 kilograms of previously prepared magnesium hydroxide is added to the sodium aluminosilicate to effect a substitution reaction to produce magnesium aluminosilicate. Then, by decantation, caustic soda remaining in solution is removed washing repeatedly with water, and the additional caustic soda formed during the substitution reaction is removed by adding little by little a solution of aluminium sulfate dissolved in a suitable amount of water little by little to neutralize the said caustic soda. The magnesium aluminosilicate thus produced is filtered under pressure and dried at a temperature below 100° C. to a powder form, and thereafter, the powder is further dried at 250° C. 83 kilograms of magnesium aluminosilicate can be obtained.

*Example 3*

Ninety six kilograms of purified aluminium sulfate is dissolved in 900 kilograms of water, and 140 kilograms of solid caustic soda is added little by little thereto, to produce sodium aluminate ($3Na_2O.SiO_2$). Then, 80 kilograms of sodium silicate containing 37 percent of $SiO_2$ is dissolved in 500 kilograms of water, and the thus obtained solution is added to the solution of sodium aluminate and stirred thoroughly to precipitate sodium aluminosilicate. 17 kilograms of magnesium hydroxide is added thereto to effect a substitution reaction, to produce magnesium aluminosilicate. Then, caustic soda remaining in solution is removed by washing repeatedly in water, and the additional caustic soda formed gradually during the substitution reaction is neutralized by adding a dilute aqueous solution of sulfuric acid. The magnesium aluminosilicate so produce is filtered under pressure and heated at a temperature below 100° C. and dried to powder, and then further dried by heating at 250° C. and pulverized. 82 kilograms of finished magnesium aluminosilicate can be obtained.

What we claim is:

1. As an antacid for medicinal purposes, magnesium aluminosilicate in the form of a fine white amorphous powder, said magnesium aluminosilicate having the formula $MgO.Al_2O_3.2SiO_2.2H_2O$, being insoluble in water and alcohol but slowly soluble with decomposition in warm hydrochloric acid and being substantially sodium-free, the antacid property of said magnesium aluminosilicate being such that 1 gram will neutralize 220–280 cc. of N/10 HCl.

2. A process for the manufacture of a magnesium aluminoisilicate having the approximate formula $$MgO.Al_2O_3.2SiO_2.2H_2O$$

which comprises mixing an aqueous sodium aluminate solution having an alumina content of from 1.7% to 6.9% and an aqueous sodium silicate solution having a silica content of 2.0% to 8%, the mol ratio of $Al_2O_3$ to $SiO_2$ being at least 1:2 to produce an insoluble sodium aluminosilicate having the formula $Na_2O.Al_2O_3.2SiO_2$; contacting said sodium aluminosilicate with magnesium hydroxide without separation of said sodium aluminosilicate from the aqueous mixture, the amount of said magnesium hydroxide being sufficient to substantially completely substitute MgO for $Na_2O$; separating substantially pure magnesium aluminosilicate from the aqueous mixture; and drying said separated magnesium aluminosilicate.

References Cited in the file of this patent

UNITED STATES PATENTS

| | | | |
|---|---|---|---|
| 1,642,880 | Kreigsheim et al. | Sept. 20, | 1927 |
| 1,759,919 | Singer | May 27, | 1930 |
| 2,512,053 | Calmon | June 20, | 1950 |
| 2,882,243 | Milton | Apr. 14, | 1959 |
| 2,882,244 | Milton | Apr. 14, | 1959 |

FOREIGN PATENTS

| | | | |
|---|---|---|---|
| 735,353 | Great Britain | Aug. 17, | 1955 |